United States Patent

[11] 3,622,203

| [72] | Inventor | Frank W. Steere, Jr.<br>Akron, Ohio |
|---|---|---|
| [21] | Appl. No. | 859,242 |
| [22] | Filed | Sept. 2, 1969 |
| [45] | Patented | Nov. 23, 1971 |
| [73] | Assignee | Steere Enterprises, Inc.<br>Tallmadge, Ohio<br>Continuation-in-part of application Ser. No.<br>724,015, Apr. 25, 1968, now abandoned. |

[54] BOOT FOR SEATBELT
7 Claims, 15 Drawing Figs.

[52] U.S. Cl. .................................................. 297/385
[51] Int. Cl. .................................................. A62b 35/60
[50] Field of Search .......................................... 297/385,
386, 387, 388, 389; 280/150 SB; 85/53, 54, 55;
151/41.75

[56] References Cited
UNITED STATES PATENTS
3,436,097  4/1969  Love .......................... 280/150 SB
3,437,349  4/1969  Feles et al. ................... 280/150 SB
FOREIGN PATENTS
493,267  5/1953  Canada ....................... 151/41.71
804,736  4/1951  Germany ..................... 85/55

*Primary Examiner*—James T. McCall
*Attorney*—Gordon C. Mack

ABSTRACT: Means is incorporated to the underside of the boot for a seatbelt, to engage the means which anchors the belt to the floor or other part of a vehicle so that the boot is not easily dislodged from its position covering said anchoring means.

This engaging means may be mechanical or magnetic. It may comprise any type of latch means such as a catch, a clamp or the like which engages the bolt or nut or the anchor plate. It may be a push-type fastener which is engaged in an end of the bolt. If the anchor bolt is threaded up through the floor or other portion of a vehicle, the nut may be incorporated in the boot and engage the bolt in the usual manner. A magnetic plate or means of other shape which holds the boot to the anchoring means may be employed. A variety of other means may be utilized.

PATENTED NOV 23 1971

INVENTOR.
FRANK W. STEERE, JR.

BY
Gordon E. Mack

ATTORNEY

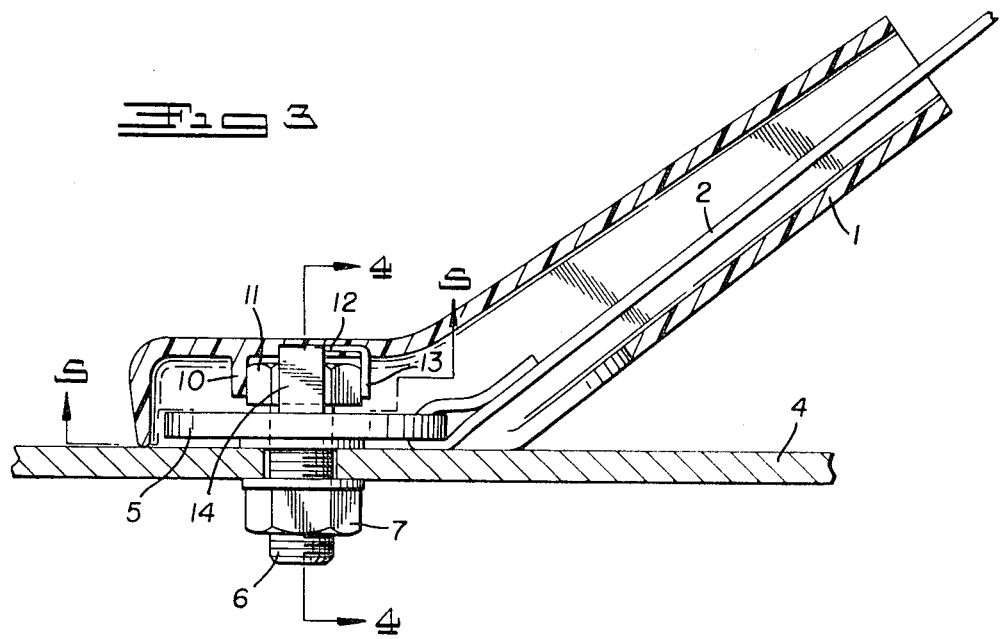
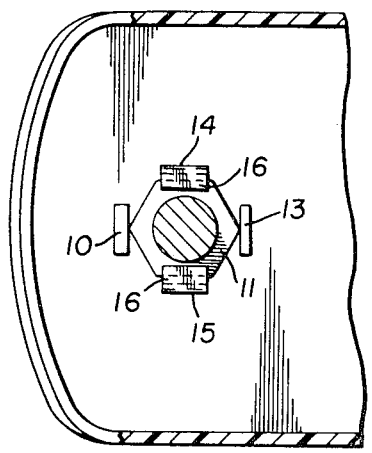
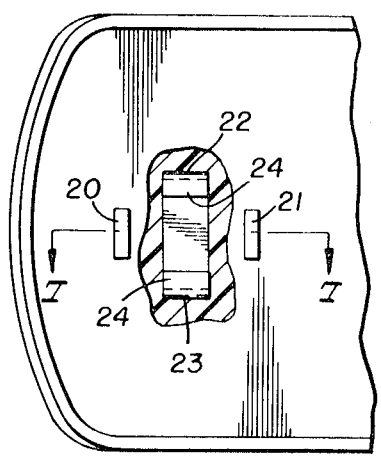
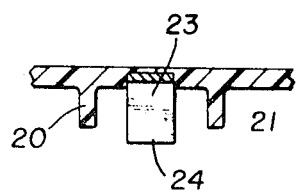

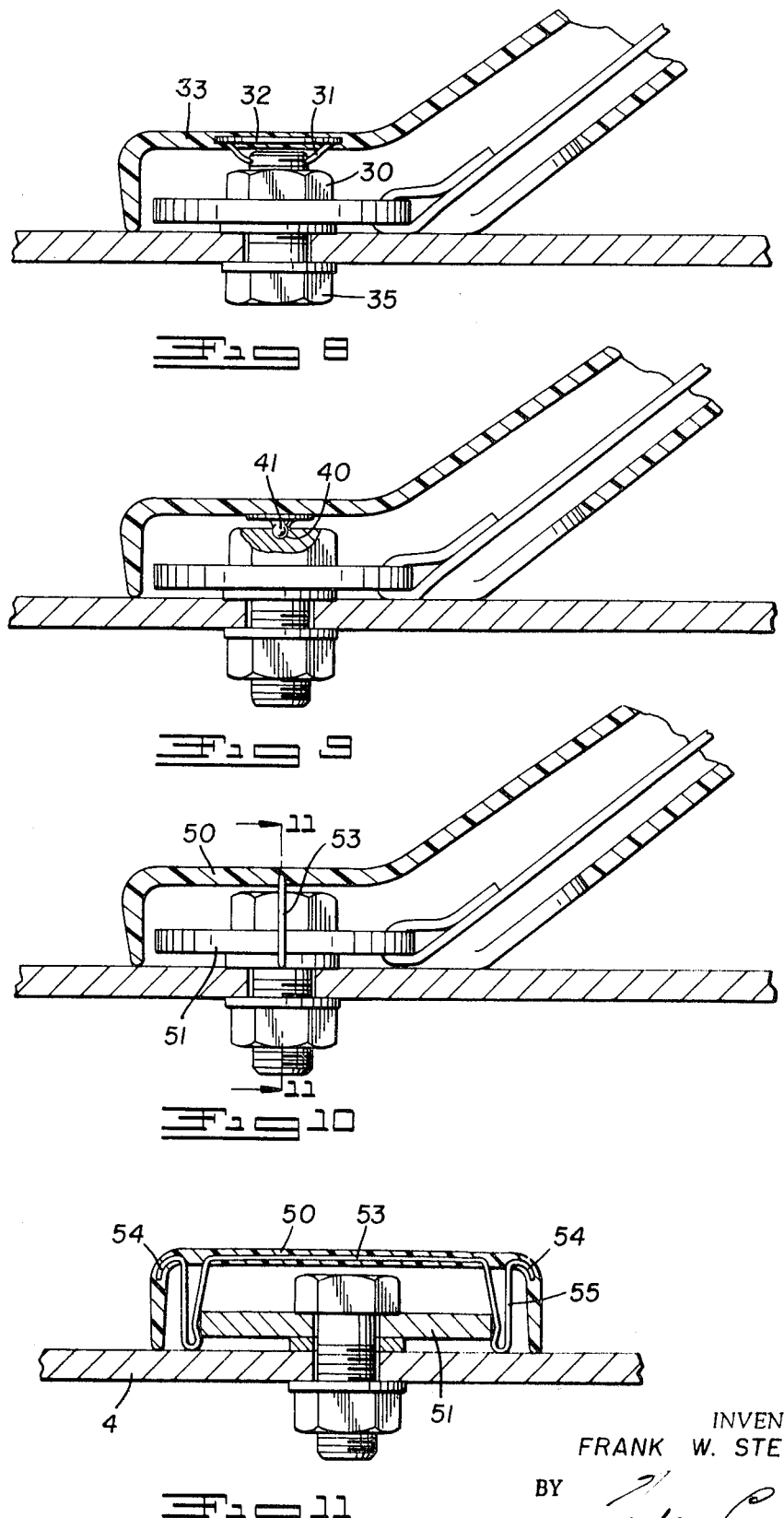

INVENTOR.
FRANK W. STEERE, JR.
BY
ATTORNEY 3,622,203

BOOT FOR SEATBELT

This application is a continuation-in-part of my application Ser. No. 724,015 filed Apr. 25, 1968, now abandoned. This invention relates to a boot to cover the anchoring means which fastens a seat belt to a vehicle. The boot is provided on the underside of the cover portion with means to engage the anchoring means. It may engage any part of the anchoring means, either the anchor plate on the end of a seat belt or the bolt which fastens this plate to a vehicle or the nut which holds the anchor plate on the bolt, or the equivalent of any one or more of these. The engaging means may be pressure actuatable or the engagement may be effected by other relative movement between the engaging means and the anchoring means. In a preferred embodiment, means is provided to engage the bolt head and elongated side means slide under the bottom of an anchor plate.

The anchoring means normally includes an anchor plate or the like fastened to the end of the belt and a bolt or the like which is passed through an opening in the anchor plate and held in position by a nut or special threaded plate. Usually a seat belt is anchored to the floor of a vehicle, and the invention will be described more particularly in connection with a boot which is to cover the anchoring means in the floor of an automobile, but it is to be understood that the boot may be used to cover other seatbelt-anchoring means. Usually the bolt which is used to fasten one end of the seat belt to the floor is passed down through the floor and the engaging means will engage the head of the bolt, unless it is designed to engage the anchor plate. It is possible to pass the bolt up through the floor and, in such cases, the engaging means may engage either the nut or the end of the threaded shank of the bolt.

Boots have been employed for some years to cover the anchoring means in automobiles. The upper portion of the boot is tunnel-shaped and surrounds the belt so that the boot is slidable on the belt. The primary engagement of the belt with the anchoring means is usually effected through the anchor plate. The boot can be slid up along the belt to provide access to the anchor plate for fastening it to a vehicle or unfastening it from a vehicle. A difficulty with the original boots was that no means was provided for maintaining them in position over the anchoring means, and oftentimes the workman at the automobile plant did not slide the boot along the belt and position it over the anchoring means before the automobile was shipped from the plant; and later, in use, the boot was easily dislodged from the anchoring means. Flap means on the boot with an opening for the anchor bolt has recently been employed, but appreciable labor is required to fasten the flap to the anchoring means and then adjust the boot over the anchoring means.

According to this invention, pressure-actuated-engaging means is provided at the underside of the boot to engage some position of the anchoring means which may be the bolt, the nut, or the anchor plate. It may be sliding engagement or a clamping or frictional or magnetic or other engagement, or a combination of two or more such means, or some other sort of engagement. The engagement may be made by sliding the boot over the anchoring means or pressing it against it, with any other movement, as required, and disengagement is effected by pushing or prying the engaging means away from the anchoring means.

The boot is preferably manufactured by dipping a form in a vinyl or other plastic composition. The engaging means, insofar as it is plastic, is readily made by a modification of the usual form of boot so that the plastic engaging means or plastic portion of the engaging means is formed integrally with the boot. Mechanical means as required may be incorporated in the boot in the usual manner of incorporating mechanical means in a dipped product. It is possible to attach the engaging means to the underside of the boot by adhesive or other suitable means, but ordinarily the engaging means will be formed as a part of the boot or incorporated as a part of the boot during the dipping operation. The shape of the boot is immaterial so long as it includes a cover portion which fits over the anchoring means.

The invention is further described in connection with the accompanying drawings, in which FIG. 1 is a view in perspective of the floor or other part of a vehicle to which the anchoring means is fastened and shows a boot shielding the anchoring means and a portion of the seat belt extending from one end of the boot;

FIG. 3 is a section on the line 3—3 of FIG. 1;

FIG. 5 is a view on the line 5—5 of FIG. 3;

FIG. 6 is a view of the underside of a boot with modified engaging means;

FIG. 7 is a section on the line 7—7 of FIG. 6;

FIGS. 8, 9 and 10 are sections through boots with three modified types of engaging means, and showing the belt and anchoring means and the portion of the vehicle to which the anchoring means is fastened;

FIG. 11 is a section on the line 11—11 of FIG. 10;

FIG. 12 is a section through a still further modification showing a portion of the boot with a different type of engaging means, and showing anchoring means and the portion of the vehicle to which it is fastened;

Figure 1:
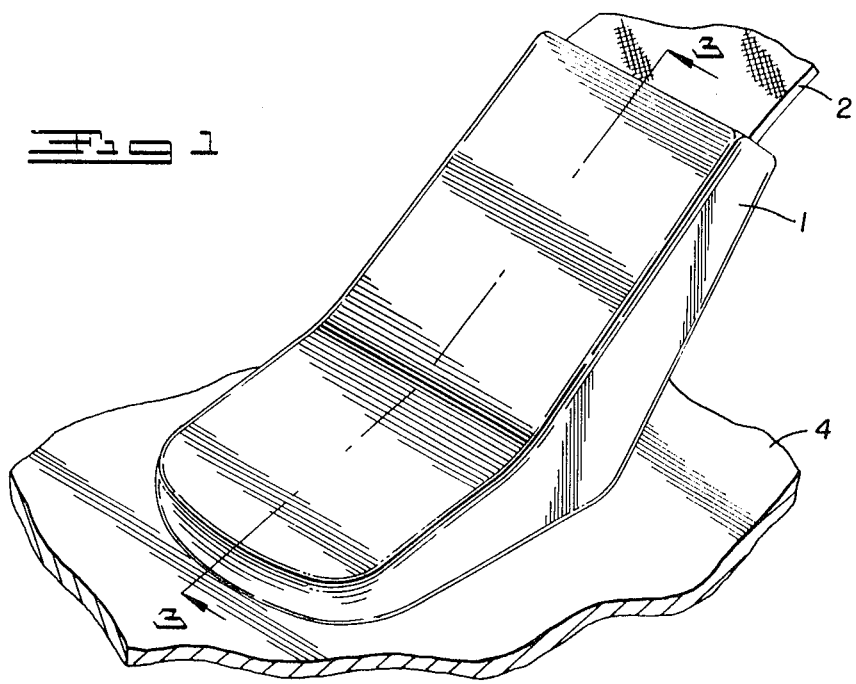
Figure 2:
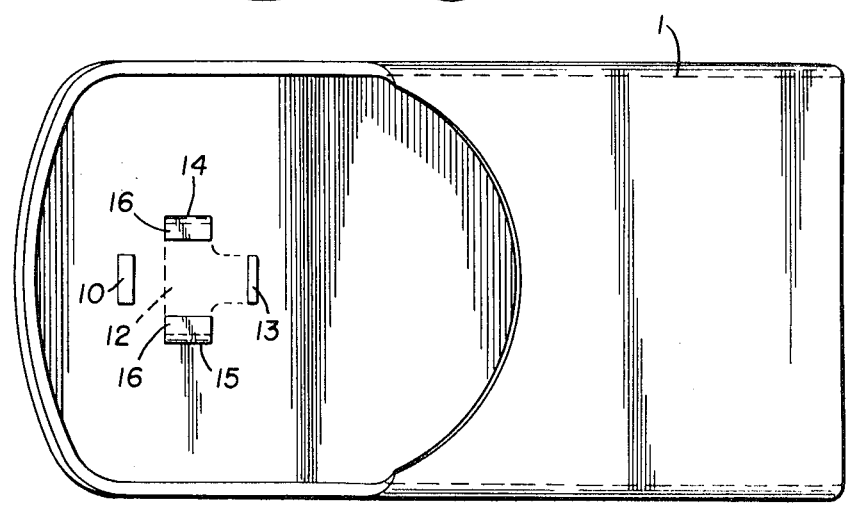
FIG. 2 is a view of the underside of the boot.
Figure 4:
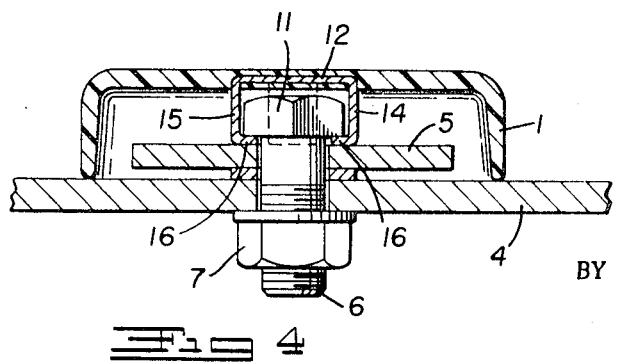
FIG. 4 is a section on the line 4—4 of FIG. 3.
Figure 1B:
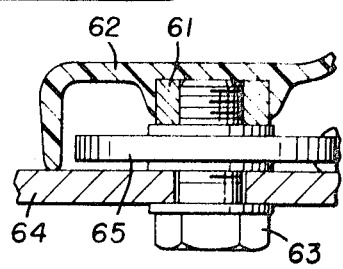

FIGS. 1 to 5 show a boot 1 slidable on the seat belt 2 and covering anchoring means through which one end of the belt is fastened to the floor 4. The anchoring means includes an anchor plate 5, the bolt 6, and the nut 7. The anchor plate is of the usual type and includes an opening through which the bolt passes and near one edge of the plate is a slot through which the end of the seat belt is threaded and then this end is stitched to the portion of the belt adjacent to the anchor plate.

The engaging means shown in these several figures includes a clip and a plastic finger 10 which is integral with the boot and extends down from the inside of the cover of the boot. This is preferably frictionally engaged with one of the six sides of the head 11 of the bolt 6, but it may be spaced a short distance from the head and merely provide a stop to retain the head of the bolt within the space provided. The clip comprises the base 12 which is embedded in the plastic of the boot and includes three legs. The leg 13 is opposite the finger 10 and serves the same function as the finger 10, but on the opposite side of the bolt head. The other two legs 14 and 15 of the clip are bent under at the bottom to form flanges 16 which are engaged under the head of the bolt.

To engage this engaging means with the anchoring means it is only necessary to press the cover of the boot against the anchoring means. The flanges 16 are spread outwardly, as by contacting the edge of one flange with one side of the bolt head and then moving the boot away from this side until the edge of the other flange contacts the opposite side of the bolt head. Then the boot is merely pressed down until the flanges snap under the edges of the bolt head. The leg 13 and finger 10 are so spaced that they either frictionally engage opposite edges of the bolt head or merely limit the possible movement of the boot. With the engaging means thus engaged over the head of the bolt, the boot is retained over the anchoring means to prevent unintentional dislodgement. If for any reason it is desired to remove the boot, it is only necessary to spread the legs 14 and 15 somewhat to disengage the flanges 16 and then lift the boot.

Various modifications of this type of engaging means are possible. Thus the finger 10 may be omitted altogether and the leg 13 might be located adjacent the opposite edge of the bolt head. Alternatively, the leg 13 may be omitted altogether and the finger 10 may be located at either edge of the head of the bolt.

One such modification is shown in FIGS. 6 and 7 in which fingers 20 and 21 are formed integrally with the boot and the metal clip comprises the two legs 22 and 23 which terminate in inturned flanges 24. A modification of this would comprise elimination of the metal clip and the use of plastic legs only. There may be only two plastic legs or there may be three or four. The bottoms of one or more of these legs may be provided with a flange to engage the bottom edge of the bolt head, but fingers with otherwise properly designated inner surfaces are satisfactory if properly located to provide the necessary engagement with the bolt head. The bolt head may be specially designated to provide the desired engagement.

In FIGS. 8 and 12, the bolt is threaded up through the opening in the floor and through the anchor plate, and the nut is then threaded on to the bolt. In all of the other views the bolt extends downwardly through the floor. In FIG. 8, after the nut 30 has been located on the bolt the boot is pressed down over the bolt. The engaging means is a snap fastener which includes a flexible annular domed portion 31 which is integral with a base 32 which is usually annular. The base 32 is embedded in the cover 33 of the boot. After the nut 30 has been tightened on the bolt 35 it is only necessary to press the boot against the end of the bolt to engage the snap fastener, and this holds the boot in place. If for any reason it is desired to obtain access to the attaching means, the boot is pried loose, and the snap fastener is thus disengaged from the bolt.

In the modification shown in FIG. 9, there is a dimple 40 in the head of the bolt. It may equally well be located in the end of the threaded shank of the bolt. The fastener 41 is of the snap type and the rounded head fits snugly in the dimple to a depth slightly beyond its portion of greatest diameter. Thus the snap fastener 41 may be frictionally engaged in the dimple simply by pressing the cover on to the anchoring means, and will remain engaged with it until the boot is lifted from the bolt. Conversely, the rounded head may extend from the bolt and the dimple may be in a plate in the cover. FIG. 9 shows the snap fastener adhered to the cover of the boot by adhesive. Any suitable adhesive or rivets or the like may be used. Alternatively, the base of the fastener may be embedded in the plastic during the dipping operation.

FIGS. 10 and 11 show a further alternative in which the boot 50 is engaged with the anchor plate 51 instead of with the bolt. The base 53 of the omega spring and the terminal portions 54 are embedded in the plastic of the boot during the dipping operation. The V-portions 55 are constructed with their inner legs indented so as to catch the edges of the anchor plate 51. This boot is easily engaged with the anchor plate by pressing it down over the anchoring means.

FIG. 12 includes a further modification in which the nut 61 is incorporated in the boot 62 during the dipping operation. To assemble the structure which is illustrated, the threaded shank of the bolt 63 is passed through the floor 64 and then through the central opening in the anchor plate 65, and the boot is lowered so that the nut 61 is positioned to receive the anchored shank of the bolt. The bolt is then tightened into the nut. Such a structure can be readily disassembled by simply turning the bolt whenever that becomes necessary.

Figure 13:
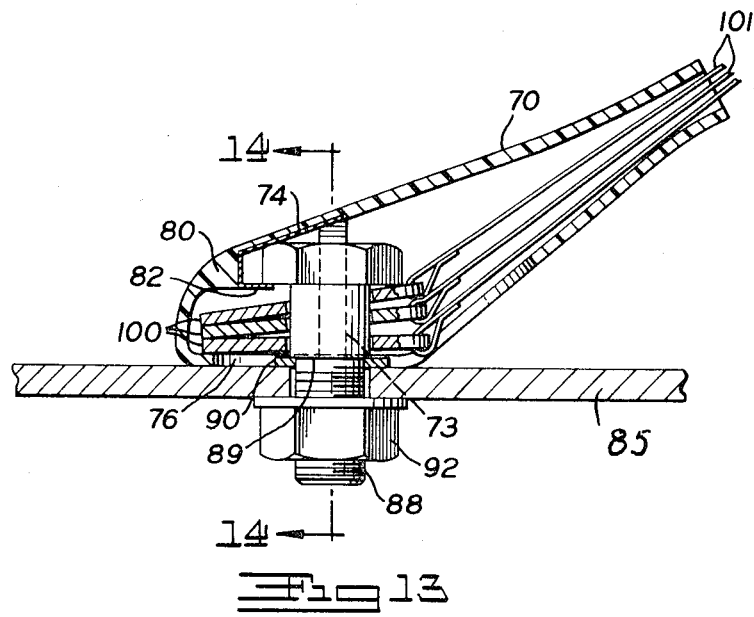
FIG. 13 is a sectional view of another modification showing three belts and anchor plates with the boot.
Figure 14:
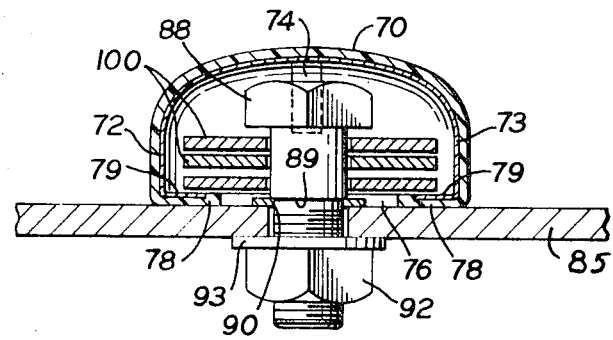
FIG. 14 is a section of the same (without the belts) at right angles to the view shown in FIG. 13.
Figure 15:
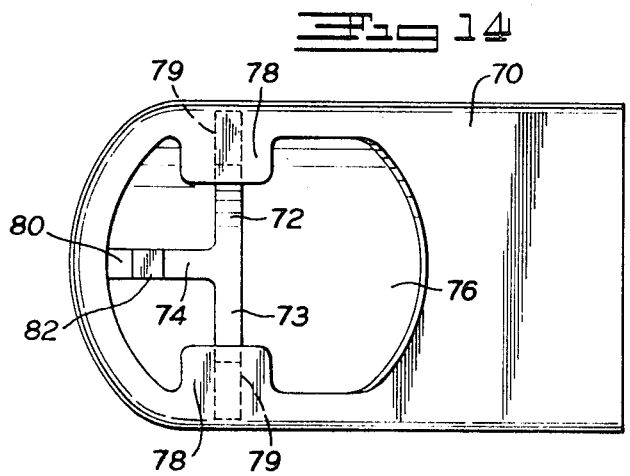
FIG. 15 is a bottom view of the same.

FIGS. 13-15 show a different type of boot 70 which may be preferred for certain reasons. A clip is molded into the boot. The clip is composed of two legs 72 and 73 at the sides thereof and a prong 74 at the front. Such clips are preferably stamped as a unit from a relatively rigid piece of metal. There is an opening 76 in the bottom of the boot. The ears 78 which protrude in from the sides of the bottom opening surround the bent-in ends 79 of the legs 72 and 73 and thus prevent abrasion of the belt. Similarly, the front of the boot protrudes inwardly at 80, immediately above the prong 74. The end 82 of this front prong is bent in. This bent-in end 82 is at a higher plane, as mounted, than the bent-in ends 79 of the legs.

The floor board 85 is shown as provided with a bolt 88 with a shoulder 89 drawn to the washer 90 by tightening nut 92 under washer 93.

The boot is shown as covering three anchor plates 100 at the ends of three belts 101. The boot is designed to be slid over one, two or three anchor plates. The end 82 of the prong 74 grips the head of the bolt. The legs 72 and 73 follow the contour of the boot and their ends 79 are engaged under the bottom anchor plate, or if there are three anchor plates it may be engaged between the bottom plate and the one above it. The boot is held firmly in place by the prong 74, but can be disengaged easily, when desired. Magnetic means may be embedded in the cover of the boot, if desired, but past experience has shown that the handling of magnetized elements at a dipping tank presents problems which are avoided by using nonmagnetic means. The magnetic means may be merely a plate and, if so, the surface will usually be exposed. It may be cupped to fit the top of the bolt, but this is not necessary. It will be appreciated that the magnetic means may take any one of a great variety of forms. It is easily engaged with the bolt or nut, or even to the anchor plate, by being brought into close proximity to it and, of course, can be readily disengaged.

The invention is covered in the claims which follow, and obviously the invention is not limited to the modifications which have been illustrated and discussed, because a wide variety of modifications is possible. The engaging means may be entirely metallic or entirely plastic, or partly metallic and partly plastic. All or any part of it may be magnetized.

I claim:

1. A boot for seat belts to cover a plurality of anchor plates at the ends of a plurality of such belts fastened to a bolt in a vehicle, in which boot means at the front is engageable in a higher plane, and means at the sides is engageable under one of the anchor plates in a lower plane.

2. The boot of claim 1 in which the boot is provided with an insert having an integral front prong and a leg at each side each of which is turned in at its bottom, with the prong adapted to engage the bolt between its bent-in end and the portion from which said end extends and the legs being bent-in in a lower plane, as mounted, than the bent-in end of the prong and being adapted to be engaged under an anchor plate.

3. The combination of (1) a seat belt with an anchor plate to cooperate with a bolt on a vehicle for fastening the belt to the vehicle and (2) a boot which is slidable on the belt toward and away from said anchor plate, and includes a cover portion with engaging means exposed on the undersurface thereof for engagement with the bolt and the anchor plate.

4. A boot which is slidable over a seat belt and includes a cover portion with sides attached thereto and a bottom, and at the inner surface of the boot a relatively rigid clip which follows the contour of the cover and sides of the boot.

5. The boot of claim 4 in which the clip is made of metal.

6. The boot of claim 4 in which the ends of the clip are bent in at the bottom of the boot.

7. The boot of claim 4 in which the clip is embedded in the boot surface.

* * * * *